United States Patent [19]
Tapp et al.

[11] Patent Number: 5,996,858
[45] Date of Patent: Dec. 7, 1999

[54] DISPENSING APPARATUS

[75] Inventors: Peter Lawrence Tapp, Walton on Thames; Sheila Kathleen Murphy, Portsmouth, both of United Kingdom

[73] Assignee: OMS Investments, Inc., Wilmington, Del.

[21] Appl. No.: 09/108,919

[22] Filed: Jun. 30, 1998

[30] Foreign Application Priority Data

Sep. 19, 1997 [GB] United Kingdom ............ 9720027

[51] Int. Cl.$^6$ ........................................ A47G 19/22
[52] U.S. Cl. ............................... 222/538; 222/523
[58] Field of Search ......................... 222/522–539

[56] References Cited

U.S. PATENT DOCUMENTS

| | | | |
|---|---|---|---|
| 1,264,503 | 4/1918 | Griffin | 222/523 |
| 1,631,951 | 6/1927 | McAnsh | 222/523 |
| 3,372,846 | 3/1968 | Berkus | 222/538 |
| 4,291,814 | 9/1981 | Conn | 222/534 |
| 5,388,712 | 2/1995 | Brody | 215/229 |

FOREIGN PATENT DOCUMENTS

| | | |
|---|---|---|
| 0591601A1 | 4/1994 | European Pat. Off. . |
| 677401 | 8/1952 | United Kingdom . |
| 798158 | 7/1958 | United Kingdom . |
| 1305055 | 1/1973 | United Kingdom . |
| 1602199 | 11/1981 | United Kingdom . |
| 2286109A | 8/1995 | United Kingdom . |

*Primary Examiner*—Steven O. Douglas
*Attorney, Agent, or Firm*—Abelman, Frayne & Schwab

[57] ABSTRACT

The dispenser apparatus may be used to dispense a granular product such as a lawn fertilizer. A duct device (300, 400, 500) for scattering the granules is stowed in a telescopically-contracted configuration under a cap (200). To use the apparatus, the cap is removed, the duct device is rotated to face in the opposite direction and the duct device is telescopically extended. This leaves the duct device projecting away from the main container (100) of the apparatus, so that the granules may flow out of the container and along the duct device to be scattered by a scatter plate (502) at the end of the duct device.

11 Claims, 6 Drawing Sheets

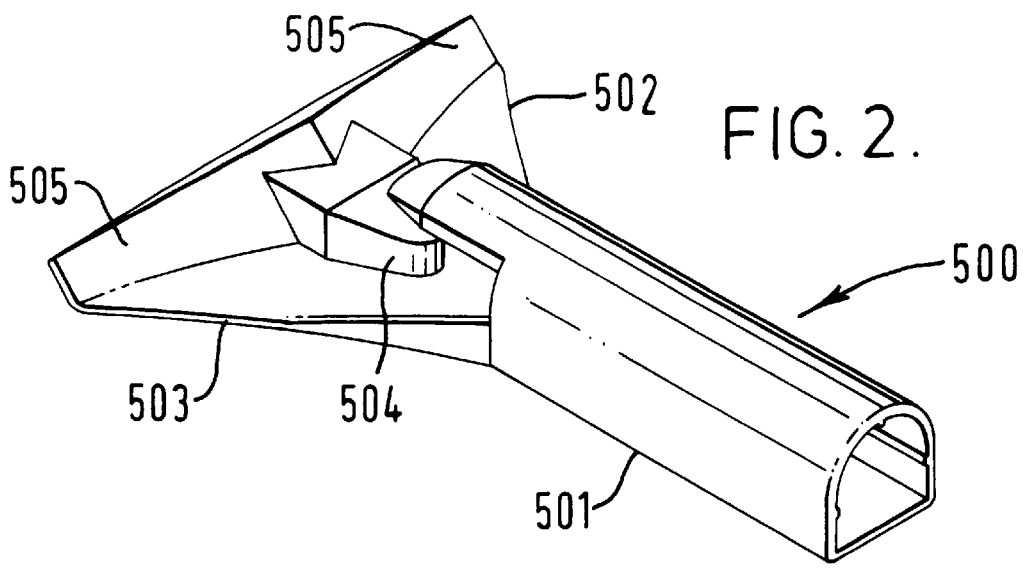
FIG. 2.
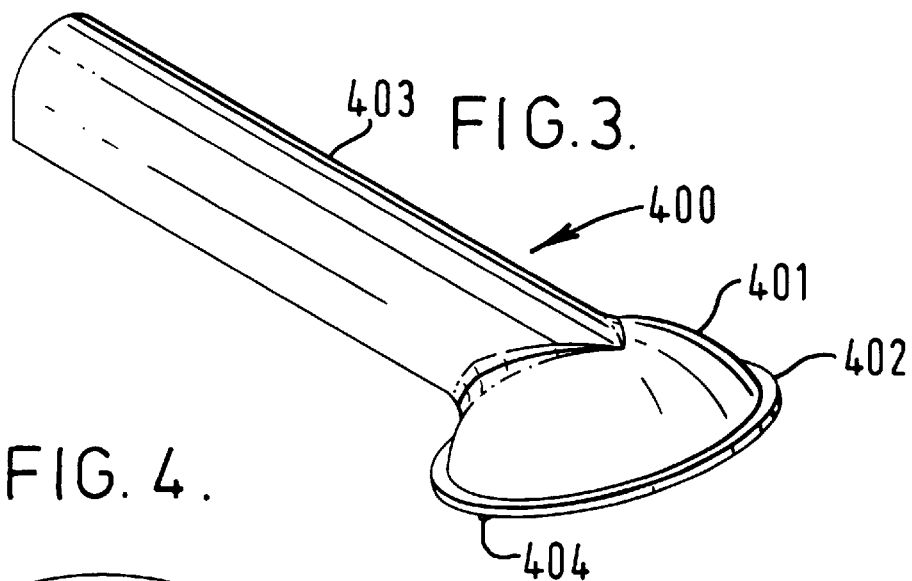
FIG. 3.
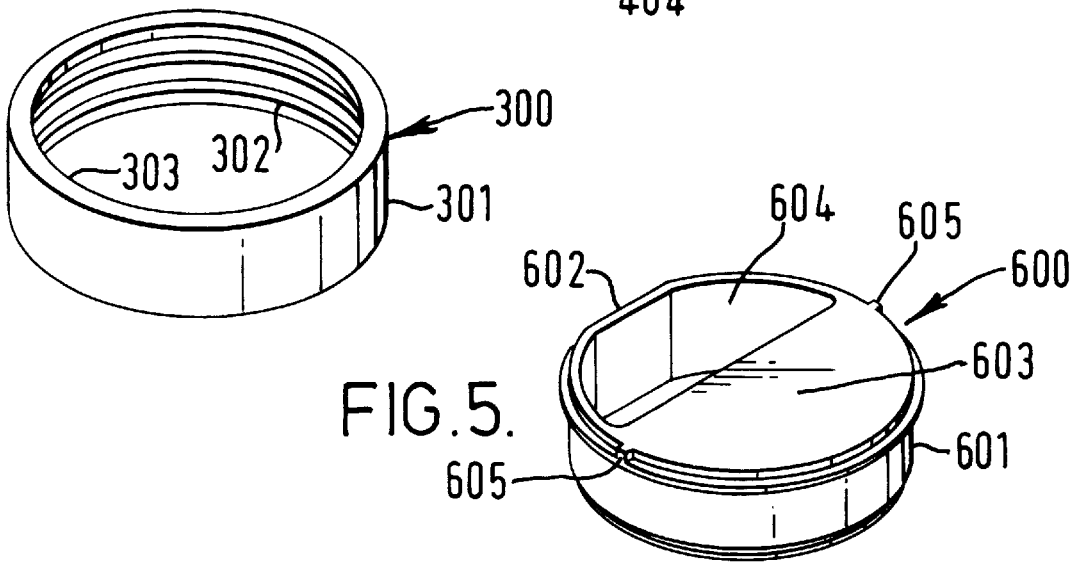
FIG. 4.
FIG. 5.

DISPENSING APPARATUS

The invention relates to dispenser apparatus which may, for example, be used to dispense a granular product such as a lawn fertilizer.

We currently sell a dispenser apparatus for lawn fertilizer granules. It is sold under the trademark Grasshopper. It has a rectangular plastics container with an integral handle along one side. The top of the container has a spout at one side which faces upwards. There is a duct device for dispensing the granules. The duct device comprises a base portion which may be screwed onto the spout of the container with the assistance of a locking collar. A tubular duct projects upwards at an oblique angle from the base portion and terminates in a scatter plate which has projections positioned in the path of the granules as they exit the tubular duct, so as to scatter the granules. The duct device extends generally in a direction which is a continuation of one of the diagonals of the container and is about one third longer than that diagonal.

Although the existing dispenser apparatus is good at dispensing the granules, it is awkward to use because the duct device must be removed from the container after use, because the apparatus is too bulky to store if the duct device is left on the container.

According to the first aspect of the present invention, there is provided dispenser apparatus comprising:
- a container for a product to be dispensed; and
- a duct device for dispensing the product from within the container;
- wherein the duct device comprises a first duct portion which is mounted on the container and a second duct portion which is telescopically connected to the first duct portion.

Because the duct portions may be telescopically contracted together after the apparatus has been used, the apparatus is less bulky to store and this removes the need to separate the duct device from the container when storing the apparatus.

Whilst the first duct portion may be rigidly fixed to the container, it is preferable that the first duct portion is rotatably mounted on the container. This enables the user to rotate the duct assembly to a convenient position when wishing to store the dispenser apparatus, in addition to telescopically contracting together the duct portions.

Preferably, the first and second duct portions are telescopic along a duct axis which is transverse to the axis of rotation of the first duct portion on the container. This enables embodiments to be produced in which the duct device projects, when deployed, over the sides of the container.

Preferably, the container has a top which is generally elongate in plan view; the first duct portion is rotatably mounted on the container at one end of the container top; and the duct device is movable between (i) a first position in which the duct device is telescopically contracted and projects in a first direction towards the other end of the container top and (ii) a second position in which the duct device is telescopically extended and projects in a second direction which is opposite to the first direction. This enables embodiments to be produced in which, when the duct device is stowed in its first position, it projects over the sides to a lesser extent than when the duct device is in its second, deployed position. It is preferable that, when the duct device is in its first postiion, it does not project past said other end of the container top. This ensures that when it is in its first, stowed position it will not project at all over the sides of the container. Consequently, the footprint of the apparatus on a surface, when it is being stored, is dictated by the container rather than by the duct device.

Preferably, the container has a handle which is positioned on a side of the container and generally under said other end of the container top. When, in use, the apparatus is held by the handle, the product in the container will fall to the opposite side of the container so as to be close to the passageway from the container into the first duct portion of the duct device. With the duct device in its second position, the duct device will be pointing downwards and thus the product will be encouraged by gravity to flow along the duct device to be dispensed.

According to a second aspect of the present invention, there is provided dispenser apparatus comprising:
- a container for a product to be dispensed;
- a cap which is removably attachable to the container over a surface portion thereof so as to cover a volume above said portion; and
- a duct device which is connected to said portion of the container for dispensing the product from within the container; wherein
- the duct device is movable between (i) a first position in which the duct device is stowed within said volume and is therefore coverable by the cap and (ii) a second position in which the duct device extends outside said volume.

The cap helps to prevent the duct device from being damaged when the dispenser apparatus is not being used.

Preferably, the duct device is rotatably mounted on the container.

Preferably, the duct device comprises a first duct portion which is mounted on said surface portion of the container and a second duct portion which is telescopically connected to the first duct portion, and the duct portions are telescopically extended when the duct device is in the second position. By making the duct device telescopic, its useful length may be increased when the extra length is needed during use of the apparatus, and its length may be minimised for stowage.

Preferably, the first and second duct portions are telescopic along a duct axis which is transverse to the axis of rotation of the first duct portion on the container.

Preferably, said surface portion of the container is elongate; the duct device is mounted on the container at one end of said elongate surface portion; the duct device, when in its first position, projects in a first direction towards the other end of said elongate surface portion; and the duct device, when in its second position, projects in a second direction which is opposite to the first direction.

A non-limiting embodiment of the present invention will now be described with reference to the accompanying drawings in which:

FIG. 2 is a perspective view of a second duct portion of a duct device of the dispenser apparatus of FIG. 1;

FIG. 3 is a perspective view of a first duct portion of the duct device;

FIG. 4 is a perspective view of a locking collar of the duct device;

FIG. 5 is a perspective view of a plug of the dispenser apparatus;

Figure 1:
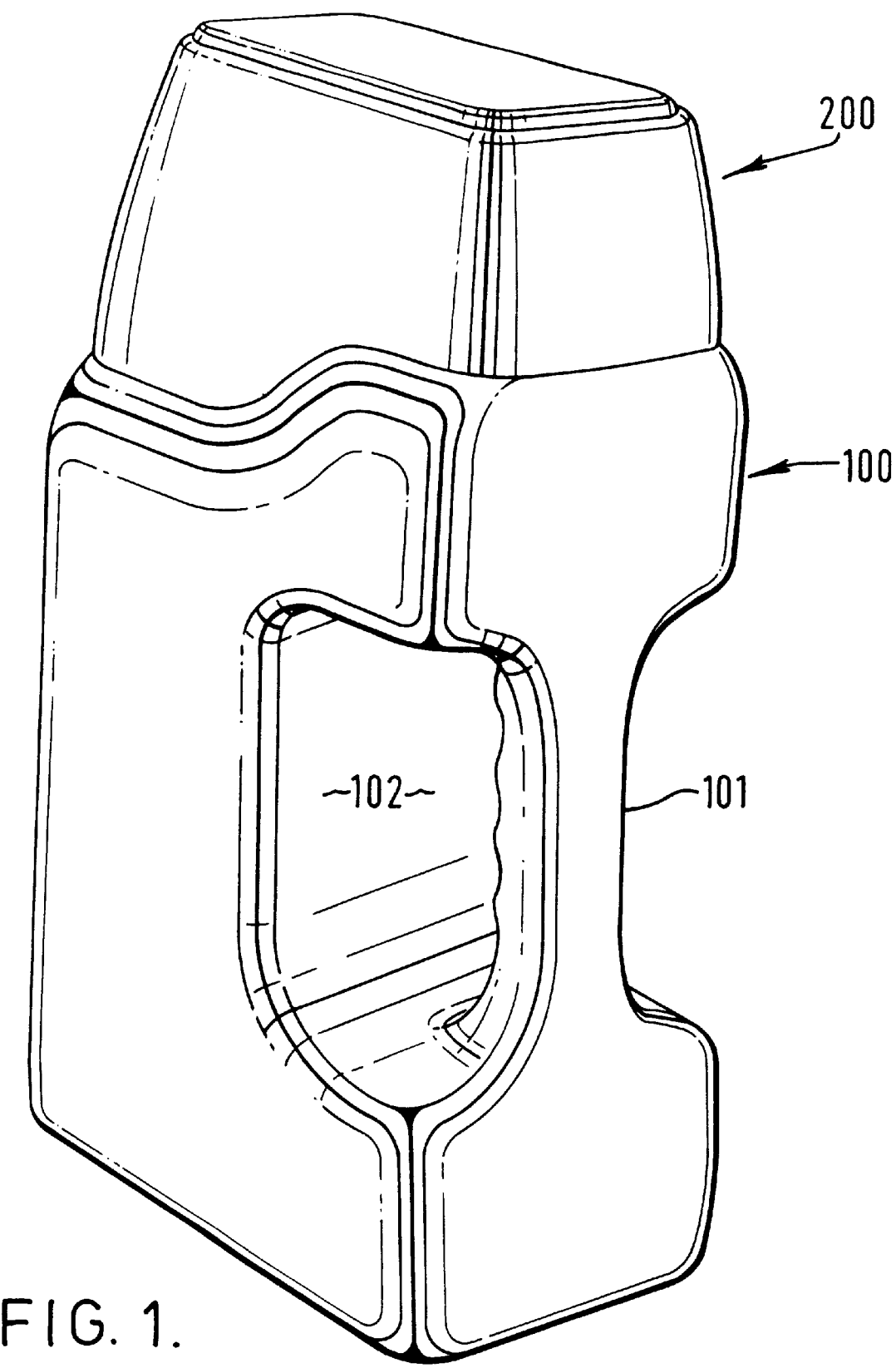
FIG. 1 is a perspective view of a dispenser apparatus in accordance with the present invention.
Figure 6:
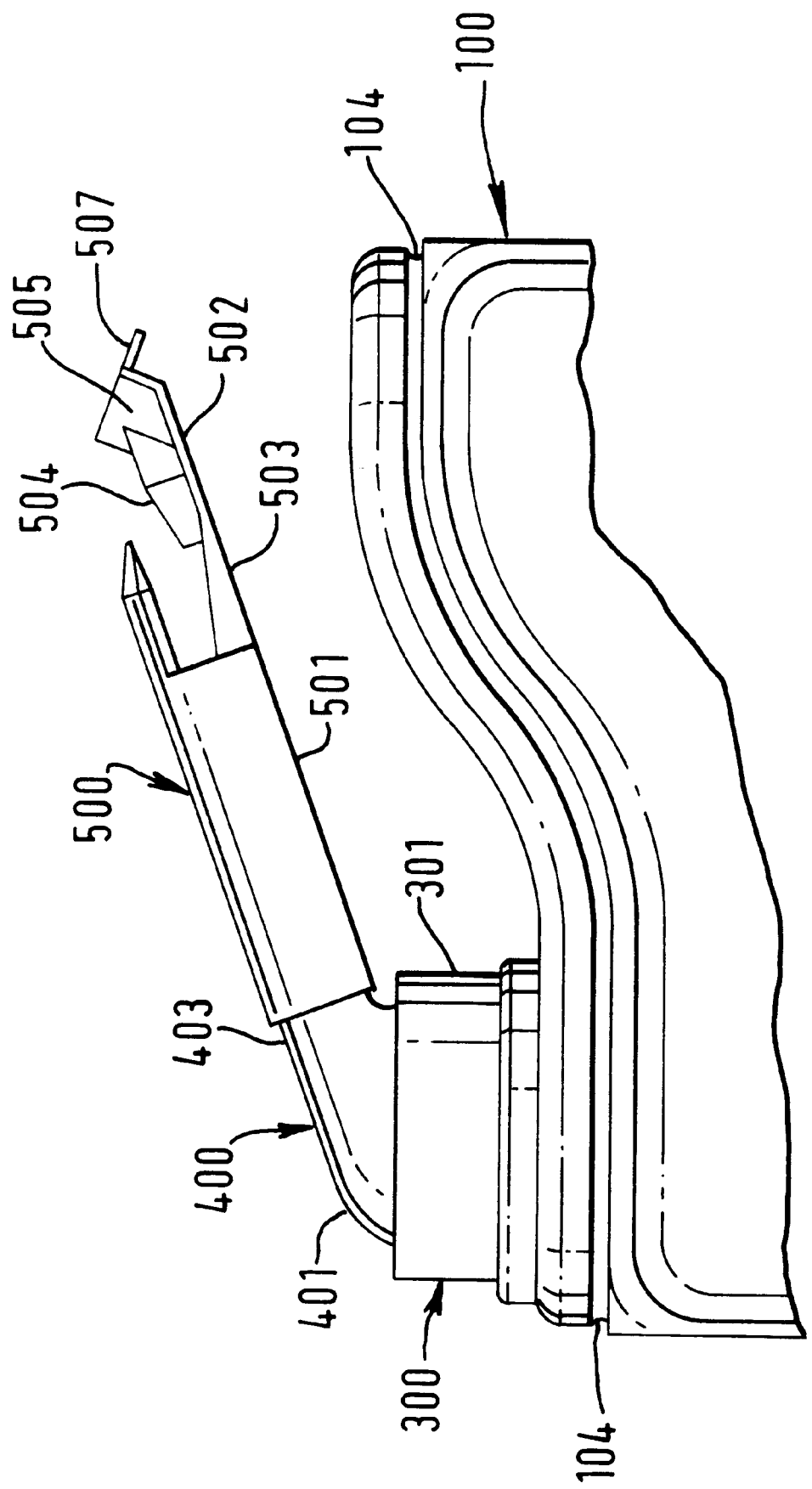
FIG. 6 is a partial side view of the dispenser apparatus, with the cap removed and the duct device in its stowed position.
Figure 7:
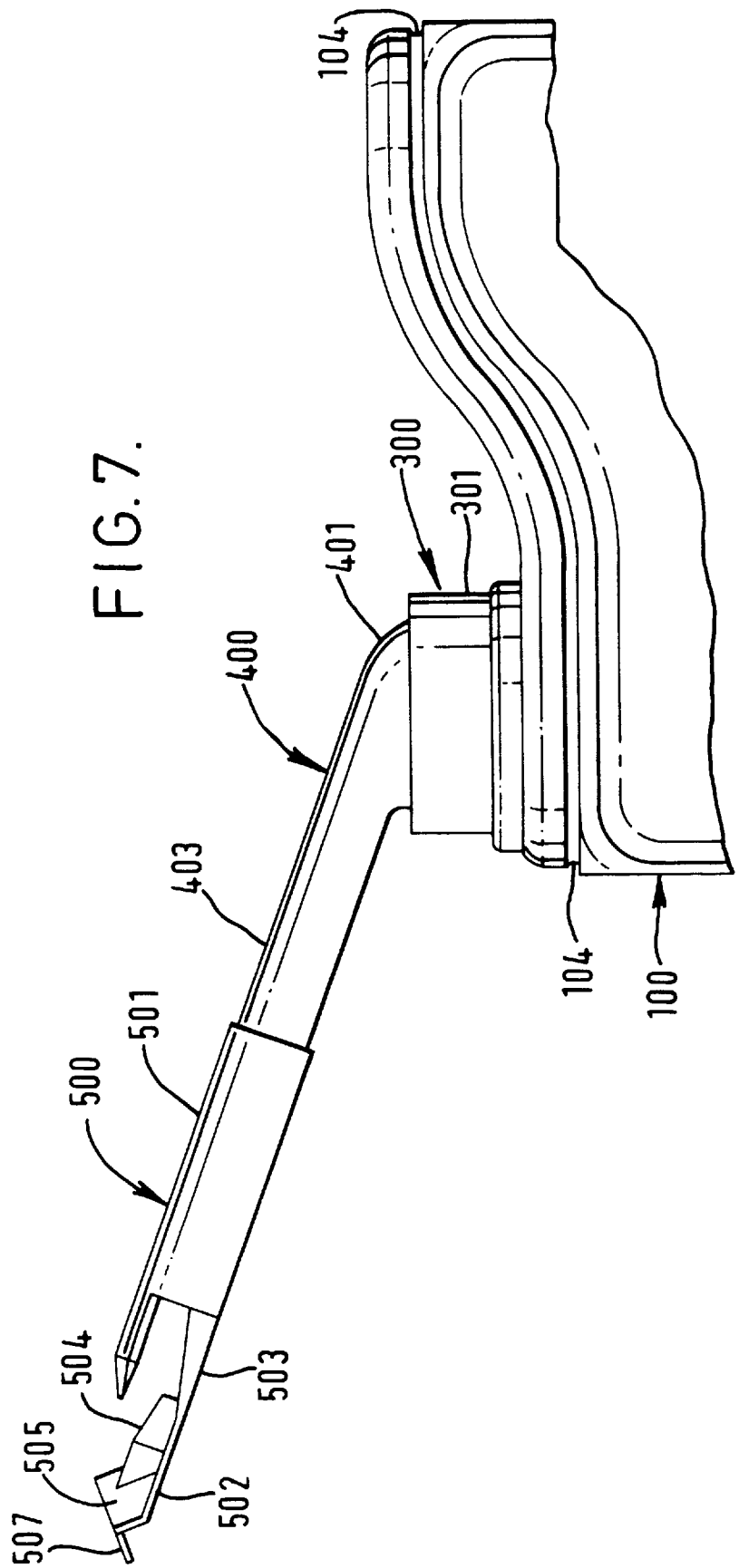
FIG. 7 is a partial side view, with the cap removed and the duct device in its deployed position.

As may be seen in FIG. 1, the dispenser apparatus comprises a hollow container 100 which has an integral handle 101 which extends upwards along one of the container sides. The container is provided with a recess 102 to allow the user's fingers to grip the inner surface of the handle 101. The container 100 is generally rectangular in form.

A cap 200 is releasably clipped onto the top of the container 100. The cap may be made of translucent or, more preferably, transparent material.

The components of a duct device of the dispenser apparatus are shown in FIGS. 2–4. There is an internally screw-threaded locking collar 300, a first duct portion 400 and a second duct portion 500.

The locking collar 300 has a generally cylindrical base portion 301 which has a screw thread 302 on its inner surface and an inwardly-projecting flange 303 at its top.

The first duct portion 400 comprises a spherically-curved hollow base portion 401 around the bottom lip of which is an outwardly-projecting annular flange 402. Projecting upwardly at an oblique angle from the base portion 401 is a tubular portion 403. The internal diameter of the flange 303 is less than the external diameter of the flange 402, and, in use, the flange 303 is designed to rest on top of the flange 402, with the hemispherical base portion 401 rising up above the collar 300.

The second duct portion 500 comprises a tubular portion 501 which is complementary in shape to, but slightly greater in cross-sectional profile than, the tubular portion 403. This enables the tubular portion 501 to slidably fit over the tubular portion 403. Their cross-sectional profiles prevent unwanted rotation between the tubular portions 403, 501 and limit their relative movement to telescopic sliding movement.

The second duct portion 500 has a scattering device 502 at the end of the tubular portion 501. The scattering device 502 comprises a triangular plate 503 in the centre of which, at a position downstream from the exit from the tubular portion 501, is a central splitter 504 for splitting in two the flow of granules. Along the downstream edge of the plate 503 are two upwardly-inclined walls 505 which serve to deflect upwards and sideways the split flows of granules.

FIG. 5 shows a plug 600 which fits in a spout of the container 100. The plug 600 comprises a generally cylindrical side wall 601 which has a localised flat portion 602 for engaging a complementary flat portion in the spout of the container, so as to prevent the plug 600 from rotating in the spout. The aperture up through the plug 600 is partially blocked by a cover plate 603 which blocks just over half the aperture, so as to leave a half-aperture 604.

In use, the first duct portion 400 rests on the top of the plug 600 and rotates relative thereto. To limit the rotation of the first duct portion 400 to about 180°, the first duct portion 400 has a downwardly-projection abutment 404 which is intended to engage with a respective one of abutments 605 of the plug 600 upon reaching the ends of its rotation through 180°.

Figure 8:
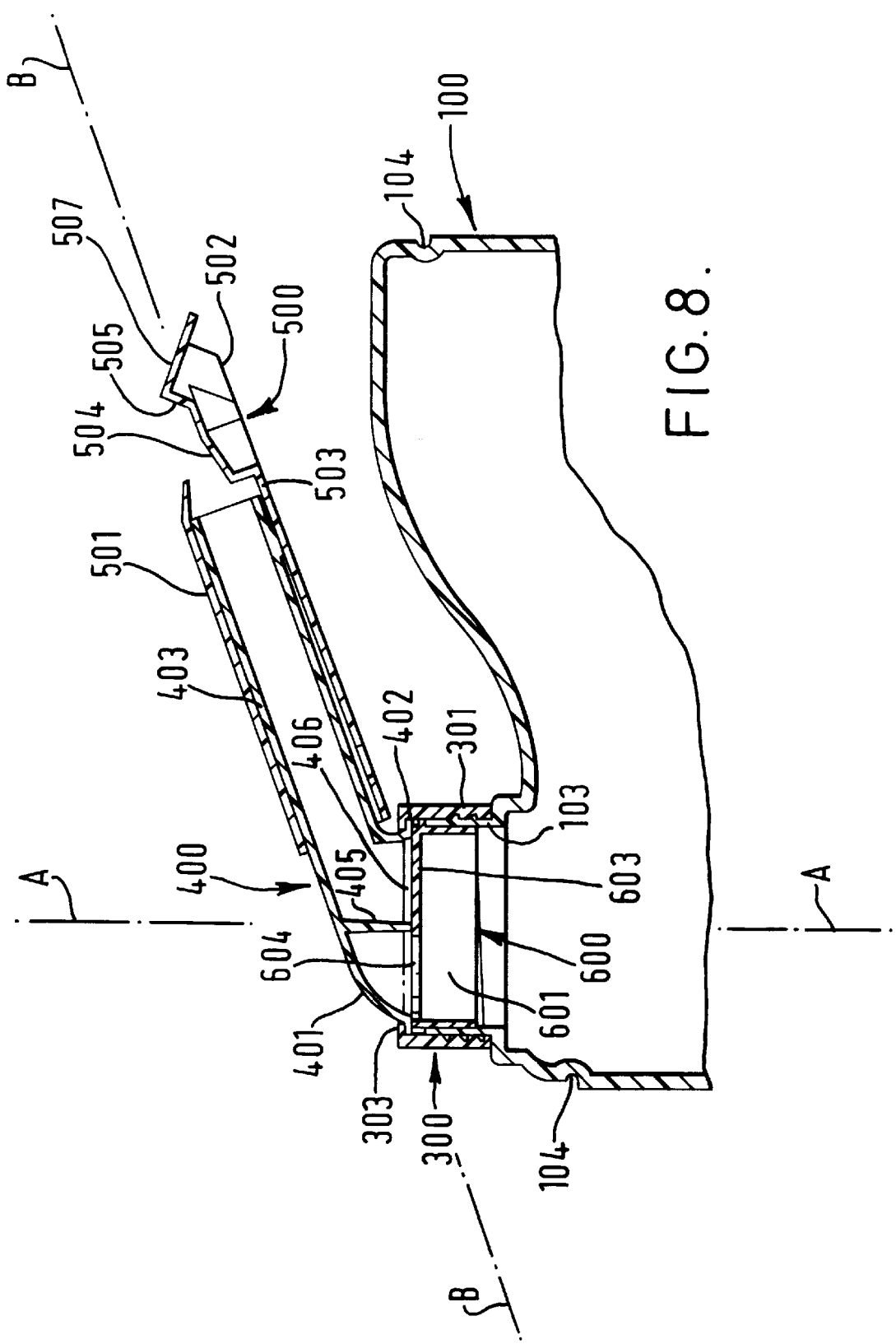
FIG. 8 is a sectional view corresponding to FIG. 6.

Referring to FIG. 8, it may be seen that the top of the container 100 has an upwardly-projecting spout 103. The spout 103 comprises a cylindrical side wall which has a screw thread on its outer surface. This screw thread is complementary to the screw thread 302 of the locking collar 300.

The plug 600 is pressed down into the spout 103.

Previously, the locking collar 300 has been passed along the tubular portion 403 so as to be positioned around the base portion 401. The locking collar 300 and first duct portion 400 are then installed in position. The base portion 401 is positioned on top of the plug 600 in the spout 103, and the locking collar 300 is screwed down so as to engage its screw thread 302 with the screw thread of the spout 103. This continues until the flange 402 is sandwiched between the flange 303 and the top of the plug 600. The first duct portion 400 is able to rotate about an axis A which extends up through the centre of the spout 103.

The second duct portion 500 is then assembled onto the first duct portion 400, by sliding the tubular portion 501 onto the tubular portion 403.

The first and second duct portions 400, 500 telescope relative to one another along an axis B aligned with their tubular portions 403, 501. It may be seen that axis B is at an oblique angle to axis A. The top of the container 100 is generally rectangular in plan view and the spout 103 is at one end of the top surface of the container 100. In the stowed position of the duct device shown in FIG. 8, the duct device projects towards the other end of the rectangular top surface of the container 100 and is sufficiently short, in its telescoped condition, so as not to extend beyond the sides of the container 100.

Within the base portion 401 is a downwardly-extending wall 405 which extends across the full diameter of the inside of the dome of the base portion 401. This wall 405 serves to define an aperture 406 which leads into the tubular portion 403. With the configuration shown in FIG. 8, in which the duct device is in its stowed position, the plate 603 of the plug 600 blocks the aperture 406. Consequently, the product within the container 100 is not able to flow into the duct device to be dispensed.

Figure 9:
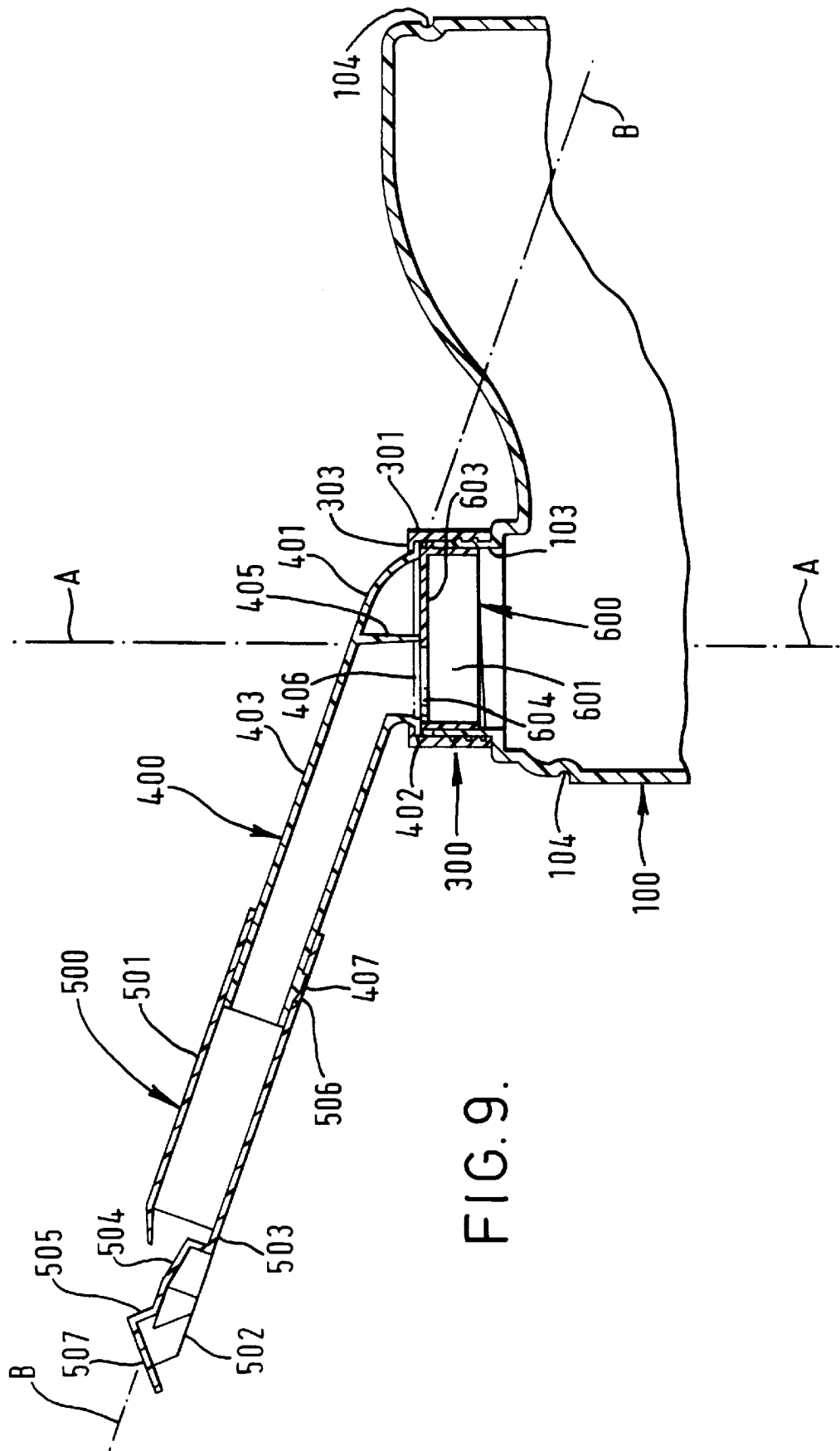
FIG. 9 is a sectional view corresponding to FIG. 7.

To move from the stowed configuration shown in FIG. 8 to the deployed configuration shown in FIG. 9, the first duct portion 400 is rotated about A to face in the opposite direction. Also, the duct portions are telescopically expanded in length by sliding the tubular portion 501 along the tubular portion 403 until a locking projection 407 engages with a locking aperture 506 to prevent further extension.

The rotation brings the half-aperture 604 of the plug 600 into alignment with the aperture 406 of the first duct portion 400. This enables the product within the container 100 to flow out through aligned apertures 604, 406 and along the tubular portions 403, 501. When the product exits from the end of the tubular portion 501, it hits the central splitter 504 and the walls 505 and is scattered in many directions. In order to reinforce the walls 505, a generally-triangular reinforcing web 507 is provided in the included angle between the walls 505 on the downstream side thereof.

It may be seen from FIG. 9 that, in the deployed configuration, the duct device projects far beyond the side walls of the container 100. As viewed in FIG. 9, the handle 101 of the container, although not actually shown in FIG. 9, would be positioned at the right-hand side of that Figure. If a user holds the apparatus by the handle 101, the product within the container 100 will fall under gravity towards the spout 103 and will then pass down along the duct device.

Recesses 104 are provided at selected positions around the periphery of the top surface of the container 100 in order to receive complementary projections (not shown) on the bottom lip of the cap 200, so as to enable the cap 200 to be removably clipped onto the top of the container 100 when the duct device is in the stowed configuration of FIG. 8, but not when the duct device is in the deployed configuration of FIG. 9.

If, as preferred, the cap 200 is made of transparent plastics material, the duct device is visible through the cap when the cap is fitted to the container. This helps to make the functioning of the apparatus self-explanatory to the user, who may not have access to the original instructions provided with the apparatus. The user can readily see that the cap must be removed to gain access to the duct device. Being able to see the duct device through the cap also adds a point of interest to the apparatus when it is on display for sale in a shop, and therefore attracts the attention of a potential purchaser to the apparatus in the shop.

The top surface of the container 100 is not flat. Because the axis B points upwards, it is possible for the top surface of the container to rise upwards underneath the rising parts of the duct device so as to increase the internal volume of the container and thereby increase the volume of product which may be stored within the container.

We claim:

1. Dispenser apparatus comprising:

a container for a product to be dispensed; and a duct device for dispensing the product from within the container;

said duct device comprising a first duct portion which is mounted on the container and a second duct portion which is telescopically connected to said first duct portion;

said first duct portion is mounted on a spout of the container;

said first duct portion is rotatably mounted on the container; and wherein:

said first and second duct portions telescope along a duct axis which is transverse to the axis of rotation of said first duct portion on the container.

2. Dispenser apparatus comprising:

a container for a product to be dispensed; and a duct device for dispensing the product from within the container;

said duct device comprising a first duct portion which is mounted on the container and a second duct portion which is telescopically connected to the first duct portion;

said first duct portion is mounted on a spout of the container;

said first duct portion is rotatably mounted on the container; and wherein:

said first and second duct portions telescope along a duct axis which is transverse to the axis of rotation of said first duct portion on the container;

the container has a top which is generally elongate in plan view;

said first duct portion is rotatably mounted on the container at one end of said container top; and said duct device is movable between (i) a first position in which said duct device is telescopically contracted and projects in a first direction towards the other end of the container top and (ii) a second position in which said duct device is telescopically extended and projects in a second direction which is opposite to said first direction.

3. Dispenser apparatus according to claim 2, wherein the duct device, when in its first position, does not project past said other end of the container top.

4. Dispenser apparatus according to claim 2, wherein the container has a handle which is positioned on a side of the container and generally under said other end of the container top.

5. Dispenser apparatus comprising:

a container for a product to be dispensed;

said container including a top surface;

a cap which is removably attachable to the container over substantially the entire area of said top surface so as to cover said top surface; and a duct device which is movably connected to a portion of the area of said top surface of the container for dispensing the product from within the container;

wherein said duct device is movable between (i) a first position in which said duct device is stowed within said area of said top surface and is therefore coverable by said cap and (ii) a second position in which said duct device extends outside of the area of said top surface.

6. Dispenser apparatus according to claim 5, wherein the duct device is mounted on a spout of the container.

7. Dispenser apparatus according to claim 5, wherein the duct device is rotatably mounted on the container.

8. Dispenser apparatus according to claim 7, wherein the duct device comprises a first duct portion which is mounted on said surface portion of the container and a second duct portion which is telescopically connected to the first duct portion, and the duct portions are telescopically extended when the duct device is in the second position.

9. Dispenser apparatus according to claim 8, wherein the first and second duct portions are telescopic along a duct axis which is transverse to the axis of rotation of the first duct portion on the container.

10. Dispenser apparatus comprising:

a container for a product to be dispensed;

a cap which is removably attachable to the container over a surface portion thereof so as to cover a volume above said portion; and a duct device which is connected to said portion of the container for dispensing the product from within the container;

said duct device is movable between (i) a first position in which said duct device is stowed within said volume and is therefore coverable by the cap and (ii) a second position in which said duct device extends outside said volume;

said duct device is rotatably mounted on said container;

said duct device comprises a first duct portion which is mounted on said surface portion of the container and a second duct portion which is telescopically connected to said first duct portion, and said duct portions are telescopically extended when the duct device is in the second position;

the first and second duct portions telescope along a duct axis which is transverse to the axis of rotation of the first duct portion on the container;

said surface portion of said container is elongate;

said duct device is mounted on said container at one end of said elongate surface portion;

said duct device, when in its first position, projects in a first direction towards the other end of said elongate surface portion; and said duct device, when in its second position, projects in a second direction which is opposite to said first direction.

11. Dispenser apparatus according to claim 10, wherein the container has a handle which is positioned on a side of the container and generally under said other end of said elongate surface portion.

* * * * *